United States Patent
Matsumoto et al.

(10) Patent No.: US 9,664,423 B2
(45) Date of Patent: May 30, 2017

(54) HEAT EXCHANGER AND HEAT PUMP SYSTEM USING SAME

(71) Applicant: SANDEN CORPORATION, Isesaki-shi (JP)

(72) Inventors: Yuuichi Matsumoto, Isesaki (JP); Yusuke Iino, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 419 days.

(21) Appl. No.: 14/390,335

(22) PCT Filed: Apr. 1, 2013

(86) PCT No.: PCT/JP2013/059934
§ 371 (c)(1),
(2) Date: Feb. 4, 2015

(87) PCT Pub. No.: WO2013/151008
PCT Pub. Date: Oct. 10, 2013

(65) Prior Publication Data
US 2015/0143835 A1 May 28, 2015

(30) Foreign Application Priority Data

Apr. 2, 2012 (JP) ................................ 2012-084064
Dec. 5, 2012 (JP) ................................ 2012-266600

(51) Int. Cl.
*F25B 30/02* (2006.01)
*F25B 39/04* (2006.01)
(Continued)

(52) U.S. Cl.
CPC ......... *F25B 30/02* (2013.01); *B60H 1/00335* (2013.01); *B60H 1/3227* (2013.01);
(Continued)

(58) Field of Classification Search
CPC .. F25B 39/00; F25B 40/02; F25B 5/04; F25B 6/04; F28D 1/053; F28D 1/05391;
(Continued)

(56) References Cited

U.S. PATENT DOCUMENTS 5,927,102 A * 7/1999 Matsuo ................... F25B 39/04
62/509
6,470,704 B2 * 10/2002 Shibata ................... F25B 39/04
165/173
(Continued)

FOREIGN PATENT DOCUMENTS

JP 11-211276 8/1999
JP H11211276 A * 8/1999 ...... F25B 2339/0443
(Continued)

OTHER PUBLICATIONS

Office Action dated Feb. 14, 2017 which issued in the corresponding Japanese Patent Application No. 2012-266600.

*Primary Examiner* — Emmanuel Duke
(74) *Attorney, Agent, or Firm* — Cozen O'Connor

(57) ABSTRACT

In a heat exchanger of a heat pump system having a main core portion, a subcool core portion, and a receiver tank, the main core portion and the subcool core portion are constituted by a pair of header tanks arranged apart from each other in a vertical direction, a plurality of tubes arranged so as to extend in the vertical direction between the header tanks and having the pair of header tanks communicate with each other, and fins arranged between the adjacent tubes, and a first channel having a refrigerant pass through the main core portion, the receiver tank, and the subcool core portion in order and a second channel having the refrigerant pass only through the main core portion in a direction opposite to that of the first channel are provided.

9 Claims, 5 Drawing Sheets

(51) Int. Cl.
| | | |
|---|---|---|
| *F28F 9/26* | (2006.01) | |
| *F25B 40/02* | (2006.01) | |
| *F25B 41/04* | (2006.01) | |
| *B60H 1/00* | (2006.01) | |
| *F28D 1/04* | (2006.01) | |
| *F28D 1/053* | (2006.01) | |
| *B60H 1/32* | (2006.01) | |
| *F25B 39/00* | (2006.01) | |
| *F28D 21/00* | (2006.01) | |
| *F25B 5/04* | (2006.01) | |
| *F25B 6/04* | (2006.01) | |

(52) U.S. Cl.
CPC .............. *F25B 39/00* (2013.01); *F25B 39/04* (2013.01); *F25B 40/02* (2013.01); *F25B 41/04* (2013.01); *F28D 1/0443* (2013.01); *F28D 1/053* (2013.01); *F28D 1/05391* (2013.01); *F28F 9/26* (2013.01); *F25B 5/04* (2013.01); *F25B 6/04* (2013.01); *F28D 2021/0084* (2013.01)

(58) Field of Classification Search
CPC ........... F28D 1/0443; F28D 2021/0084; B60H 1/3227; B60H 1/00335
See application file for complete search history.

(56) References Cited

U.S. PATENT DOCUMENTS

| | | | | |
|---|---|---|---|---|
| 6,477,858 B2* | 11/2002 | Nobuta | ................... | F25B 39/04 62/509 |
| 6,971,251 B2* | 12/2005 | Brost | ...................... | F25B 39/04 62/509 |
| 8,250,874 B2* | 8/2012 | Ikegami | ............ | B60H 1/00335 165/100 |

FOREIGN PATENT DOCUMENTS

| | | |
|---|---|---|
| JP | 2000-257989 | 9/2000 |
| JP | 2003-21432 | 1/2003 |
| JP | 2003-106708 | 4/2003 |
| JP | 2004-361019 | 12/2004 |
| JP | 2009-236404 | 10/2009 |
| WO | WO 2011/087001 | 7/2011 |

\* cited by examiner

HEAT EXCHANGER AND HEAT PUMP SYSTEM USING SAME

RELATED APPLICATIONS

This is a U.S. National stage of International application No. PCT/JP2013/059934 filed on Apr. 1, 2013.

This patent application claims the priority of Japanese application no. 2012-084064 filed Apr. 2, 2012 and 2012-266600 filed Dec. 5, 2013, the disclosure content of which is hereby incorporated by reference.

TECHNICAL FIELD

The present invention relates to a heat exchanger and a heat pump system using the same and relates to a heat exchanger having functions of both a condenser and an evaporator and used as an exterior heat exchanger of an air-conditioning heat pump system and a heat pump system using the same.

BACKGROUND ART

As an exterior heat exchanger used for a heat pump system for vehicle air-conditioning and the like, a subcool system condenser provided with a main core (condenser core) portion for condensing a refrigerant by heat exchange with air, a receiver tank into which the refrigerant having passed through the main core portion flows, and a subcool core portion for completely liquefying the liquid refrigerant having passed through the receiver tank by supercooling it by heat exchange with the air is disclosed (see Patent Document 1, for example).

The above-described main core portion and the subcool core portion are constituted by a plurality of tubes allowing a pair of header tanks arranged at an interval in a state in parallel with each other to communicate with each other and fins arranged between adjacent tubes, for example.

PRIOR ART DOCUMENT

Patent Document

Patent Document 1: Japanese Patent No. 4052706

SUMMARY OF THE INVENTION

Problems to be Solved by the Invention

However, if the heat exchanger provided with the main core portion and the subcool core portion as in the above-described Patent Document 1 is used as an exterior heat exchanger of a heat pump type air conditioning apparatus capable of both cooling and heating, when it is used as a condenser in a cooling operation, for example, it is possible to sufficiently cool the refrigerant by the subcool core portion, but when it is used as an evaporator in a heating operation, though sufficient evaporation is possible with the main core portion, since the refrigerant is made to pass through both the main core portion and the subcool core portion, a pressure loss during refrigerant passage is large, and there is a concern that heating capacity might deteriorate.

The present invention was made in view of the above-described circumstances and has an object to provide a heat exchanger suitable for an exterior heat exchanger of a heat pump system having functions of both a condenser and an evaporator, largely improved heat exchange efficiency, and a pressure loss during refrigerant passage suppressed and a heat pump system using the heat exchanger.

Means for Solving the Problems

In order to achieve the above object, a heat exchanger of the present invention has a main core portion for conducting heat exchange between air and a refrigerant, a receiver tank into which the refrigerant having passed through the main core portion flows, and a subcool core portion for supercooling the refrigerant having passed through the receiver tank by heat exchange with the air and is a heat exchanger used for a heat pump system capable of cooling and heating, in which the main core portion and the subcool core portion are constituted by a pair of header tanks arranged apart from each other in a vertical direction, a plurality of tubes arranged so as to extend in the vertical direction between the header tanks and having the pair of header tanks communicate with each other and fins provided on the tubes, and a first channel through which the refrigerant is made to pass in the order of the main core portion, the receiver tank, and the subcool core portion, and a second channel through which the refrigerant is made to pass only through the main core portion in a direction opposite to that of the first channel are provided.

Moreover, another heat exchanger of the present invention has a main core portion for conducting heat exchange between air and a refrigerant, a receiver tank into which the refrigerant having passed through the main core portion flows, and a subcool core portion for supercooling the refrigerant having passed through the receiver tank by heat exchange with the air and is a heat exchanger used for a heat pump system capable of cooling and heating, in which the main core portion and the subcool core portion are constituted by a pair of header tanks arranged apart from each other in a vertical direction, a plurality of tubes arranged so as to extend in the vertical direction between the header tanks and having the pair of header tanks communicate with each other and fins provided on the tubes, and a first channel through which the refrigerant is made to pass in the order of the main core portion, the receiver tank, and the subcool core portion, and a second channel through which the refrigerant is made to pass only through the main core portion in the same direction as that of the first channel are provided.

Preferably, in each of the above-described heat exchangers, the subcool core portion has a plurality of paths through which the refrigerant is able to pass between the pair of header tanks at least once each in the vertical direction and has a channel sectional area of the refrigerant set smaller than that of the main core portion.

Preferably, in each of the above-described heat exchangers, the main core portion and the subcool core portion are arranged adjacently to each other.

A heat pump system according to the present invention is a heat pump system used by switching each of the heat exchangers to a condenser or an evaporator, and when the heat exchanger is used as the condenser, the refrigerant is made to flow through the first channel, while when the heat exchanger is used as an evaporator, the refrigerant is made to flow through the second channel.

Preferably, in the heat pump system, the heat exchanger is used as an exterior heat exchanger of an air-conditioning apparatus for a vehicle.

Advantageous Effects of the Invention

According to a heat exchanger of the present invention, since the refrigerant passes through the main core portion and the subcool core portion by having the refrigerant pass through the first channel, heat exchange with an outside air can be sufficiently ensured, and a heat exchanger suitable as a condenser of a heat pump system can be obtained. Moreover, by having the refrigerant pass through the second channel, the refrigerant passes only through the main core portion, and thus, a pressure loss during refrigerant passage through the subcool core portion and the receiver tank can be suppressed, and a heat exchanger suitable as an evaporator of a heat pump system can be obtained.

Furthermore, in both of the main core portion and the subcool core portion of the heat exchanger, a refrigerant flow in a vertical flow direction in which the refrigerant is made to pass in the vertical direction can be realized. As a result, when the heat exchanger is used as an exterior heat exchanger, occurring of frosting and icing phenomena on the tube surface can be suppressed, and heat exchange between the air and the refrigerant in the main core portion and the subcool core portion can be continued for a long time, and heat exchange efficiency of the heat exchanger can be largely improved.

According to another heat exchanger of the present invention, by providing a first channel through which a refrigerant is made to pass in the order of a main core portion, a receiver tank, a subcool core portion and a second channel through which the refrigerant is made to pass only through the main core portion in the same direction as that of the first channel, the heat exchanger can be used as a condenser or an evaporator by switching without changing the refrigerant flow direction in the main core portion, and heating inlet port and a cooling inlet port can be shared on the same side of the main core portion. As a result, as compared with a use of the heat exchanger by switching to a condenser or an evaporator by changing the refrigerant flow direction in the main core portion, a routing location of a refrigerant pipeline is decreased, a total pipeline length can be reduced, and a circuit configuration of a refrigerant circuit can be simplified and thus, switching of the exterior heat exchanger between the evaporator and the condenser in the heat pump system can be performed with a simpler configuration.

Moreover, according to the present invention, since the subcool core portion has a plurality of cores and the channel sectional area of the refrigerant is set small, a flow velocity of the refrigerant passing through the subcool core portion can be increased. Therefore, even if the refrigerant is close to a liquid state in the subcool core portion and has a vertical flow, upward passage of the refrigerant can be realized reliably, and heat exchange efficiency can be improved. Thus, even if the refrigerant is supercooled in the subcool core portion by the subcool core portion after passage of the main core portion, a cooling performance can be sufficiently ensured.

According to the present invention, since the subcool core portion is constituted integrally with the main core portion and the subcool core portion adjacent to each other, the heat exchanger can be produced in a compact manner and easily.

Moreover, according to the heat pump system of the present invention, since the refrigerant is made to pass through the first channel when the heat exchanger is used as a condenser, the refrigerant passes through the main core portion, the receiver tank, and the subcool core portion, and a condenser with a high heat radiation effect can be obtained. Moreover, when the heat exchanger is used as an evaporator, the refrigerant is made to pass through the second channel and thus, the refrigerant passes through the main core portion, and a pressure loss generated during refrigerant passage through the subcool core portion and the receiver tank can be suppressed. By switching the channel of the refrigerant as above, the evaporator and the condenser in the heat pump system can be used by switching one heat exchanger.

Moreover, according to the present invention, since the heat exchanger is used as an exterior heat exchanger for air-conditioning of a vehicle, it can be used as an exterior condenser in a cooling operation and can be used as an exterior evaporator in a heating operation, for example, and a heat pump system suitable for an air-conditioning apparatus for a vehicle can be provided.

MODE FOR CARRYING OUT THE INVENTION

A heat exchanger according to an embodiment of the present invention and a heat pump system using the same will be explained below by referring to the attached drawings.

Figure 1:
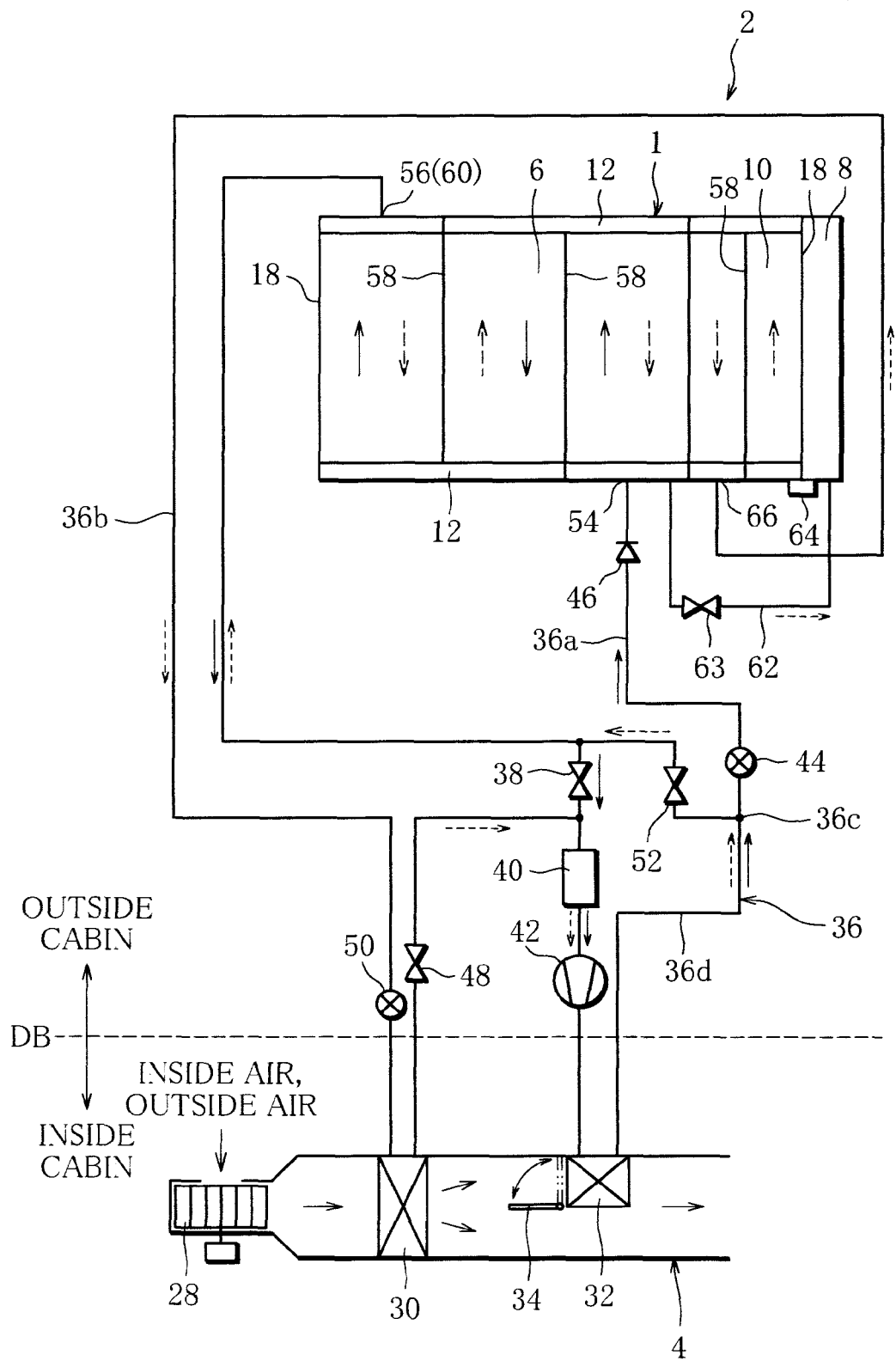
FIG. 1 is a diagram illustrating a heat pump system for air-conditioning of a vehicle according to a first embodiment of the present invention and an outline configuration of a HVAC unit.
Figure 2:
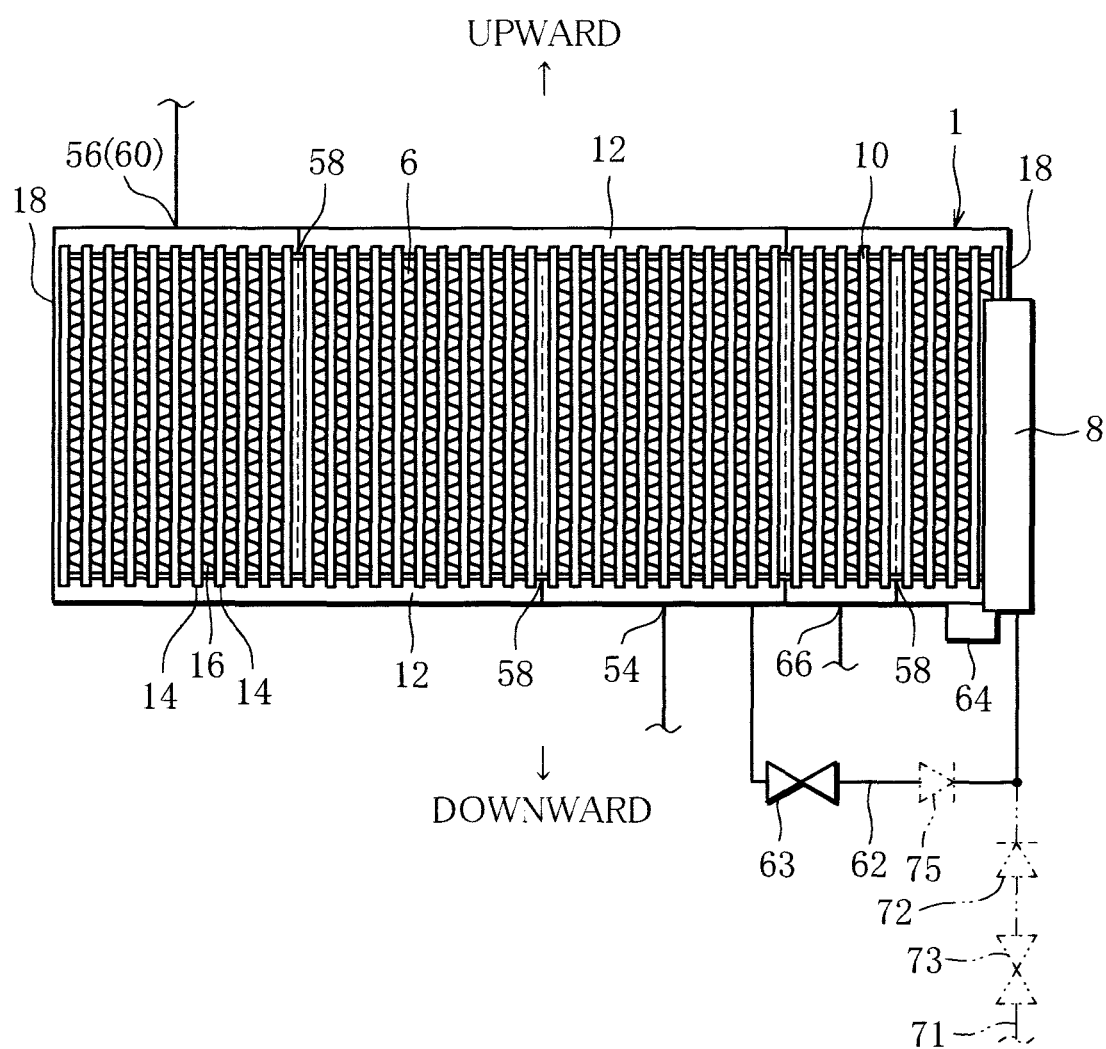
FIG. 2 is a front view illustrating a structure of an exterior heat exchanger according to an embodiment of the present invention.

FIG. 1 illustrates an outline configuration of a heat pump system 2 for air-conditioning of a vehicle according to a first embodiment of the present invention into which an exterior heat exchanger 1 (heat exchanger) is incorporated and a HVAC (Heating Ventilation & Air Conditioning) unit 4 to which the heat pump system 2 is connected. FIG. 2 is a front view illustrating a structure of the exterior heat exchanger 1.

As illustrated in FIGS. 1 and 2, the exterior heat exchanger 1 includes a main core portion 6 for conducting heat exchange between air and a refrigerant, a receiver tank 8 into which the refrigerant having passed through the main core portion 6 flows, and a subcool core portion 10 for supercooling a liquid refrigerant having passed through the receiver tank 8 by heat exchange with air.

The main core portion 6 and the subcool core portion are constituted by a pair of header tanks 12 and 12 arranged apart from each other in a vertical direction in a state in parallel with each other, a plurality of tubes 14 arranged so as to extend in the vertical direction between the header tanks 12 and 12 and communicating with both the upper and lower header tanks 12 and 12, and fins 16 arranged between the adjacent tubes 14. The subcool core portion 10 is juxtaposed on an upper right side of the figure of the main core portion 6. The fins 16 located on a left end portion of the main core portion 6 and a right end portion of the subcool core portion 10 are joined to a cover member 18 so that rigidity of the main core portion 6 and the subcool core portion 10 is ensured.

The receiver tank 8 is fixed to the cover member 18 on the right side of the subcool core portion 10.

Therefore, the main core portion 6 and the subcool core portion 10 are integrally constituted adjacently to each other, and the exterior heat exchanger 1 is integrally constituted with the receiver tank 8 fixed to the right side of the subcool core portion 10.

The HVAC unit 4 is mounted on a front side in a cabin of a vehicle and fixed to an inner side in the cabin of a dash panel DB defining an engine room of the vehicle and the inside of the cabin. In the HVAC unit 4, a blower fan 28, an interior evaporator 30, and an interior condenser 32 are installed inside in order from a flowing direction of the air. A damper 34 for opening/closing an air inlet to the interior condenser 32 is provided on an upstream side of the air flow in the interior condenser 32, and by closing the damper 34 as indicated by a broken line in FIG. 1, the air can be made to flow by bypassing the interior condenser 32.

The heat pump system 2 is configured to be able to use the exterior heat exchanger 1 by switching it to the condenser or the evaporator by changing the flow direction of the refrigerant in the main core portion 6, and the exterior heat exchanger 1 is used as an evaporator in a heating operation and is used as a condenser in a cooling operation of the heat pump system 2.

In more detail, the heat pump system 2 is provided with a refrigerant circuit 36 through which the refrigerant circulates, and in a heating-operation channel 36a in the refrigerant circuit 36, the exterior heat exchanger 1, a first opening/closing valve 38, an accumulator 40, a compressor 42, the interior condenser 32, a first expansion valve 44, and a check valve 46 are inserted in the order in the refrigerant flow direction indicated by a solid line arrow in FIG. 1. The check valve 46 is arranged so as to prevent passage of the refrigerant from the exterior heat exchanger 1 to the first expansion valve 44 when the exterior heat exchanger 1 functions as a condenser.

On the other hand, in a cooling-operation channel 36b in the refrigerant circuit 36, the exterior heat exchanger 1, a second expansion valve 50, the interior evaporator 30, a second opening/closing valve 48, the accumulator 40, the compressor 42, the interior condenser 32, and a third opening/closing valve 52 are inserted in the order in the refrigerant flow direction indicated by a broken line arrow in FIG. 1.

The cooling-operation channel 36b is formed having a common path 36d shared with the heating-operation channel 36a from the accumulator 40 to a branch path 36c to a third opening/closing valve 52 and the first expansion valve 44 through the compressor 42 and the interior condenser 32.

Moreover, a heating inlet port 54 is provided on the header tank 12 on the lower right side of the main core portion 6 of the exterior heat exchanger 1, and a heating outlet port 56 and a cooling inlet port 60 are provided in common on the header tank 12 on the upper left side of the main core portion.

Furthermore on the header tank 12 on the lower right side of the main core portion 6, one end of an inlet communication pipe 62 is connected in the vicinity of the heating inlet port 54, while the other end of the inlet communication pipe 62 is connected to the receiver tank 8. In the inlet communication pipe 62, a fourth opening/closing valve 63 is interposed.

Moreover, an outlet communication pipe 64 for connecting a lower-side end portion of the receiver tank 8 and a lower-right side end portion of the subcool core portion 10 is provided. Furthermore, on the header tank 12 on the lower left side of the subcool core portion 10, a cooling outlet port 66 of the cooling-operation channel 36b is provided for the exterior heat exchanger 1.

Driving portions of the damper 34 and the first to fourth opening/closing valves 38, 48, 52, and 63 are electrically connected to an ECU (electric control unit), not shown, for comprehensively controlling the vehicle. The ECU introduces air blown from the blower fan 28 to the interior condenser 32 by opening the damper 34 in the heating operation using the heating-operation channel 36a and causes the air blown from the blower fan 28 to bypass the interior condenser 32 by closing the damper 34 in the cooling operation using the cooling-operation channel 36b. Then the compressor 42 is operated, and the first to fourth opening/closing valves 38, 48, 52, and 63 are controlled to be opened/closed as appropriate, whereby the heating operation and the cooling operation can be selectively operated. In more detail, in the heating operation, the first opening/closing valve 38 is opened, and the second to fourth opening/closing valves 48, 52, and 63 are closed. In the cooling operation, the second to fourth opening/closing valves 48, 52, and 63 are opened, and the first opening/closing valve 38 is closed.

In the heat pump system 2 with the above-described configuration, since the check valve 46 for preventing the refrigerant flow from the main core portion 6 to the heating-operation channel 36a side is inserted on the inlet side of the main core portion 6 of the heating-operation channel 36a, a refrigerant inflow into the heating-operation channel 36a in the cooling operation is prevented.

On the other hand, the fourth opening/closing valve 63 is interposed in the inlet communication pipe 62, and by closing the fourth opening/closing valve 63 in the heating operation, inflow of the refrigerant into the receiver tank 8 and the subcool core portion 10 is prevented.

In the heating operation, the refrigerant having flowed in from the heating inlet port 54 to the main core portion 6 repeats the vertical flow of downflow or upflow using a plurality of partition plates 58 partitioning the inside of each of the header tanks 12 as boundaries, performs heat exchange with ambient air by ventilation to the main core portion 6, passes from the right side to the left side in entirety as indicated by a solid line arrow in FIG. 1 and is sent out to the heating-operation channel 36a from the heating outlet port 56. As described above, the refrigerant in the heating operation passes only through the main core portion 6 in the exterior heat exchanger 1. A refrigerant channel from the heating inlet port 54 of the exterior heat exchanger to the heating outlet port 56 through the main core portion 6 corresponds to the second channel of the invention of the present application.

In the cooling operation, the refrigerant flowing into the main core portion 6 from the cooling inlet port 60 repeats downflow or upflow as described above, performs heat exchange with the ambient air by ventilation to the main core portion 6, passes from the left side to the right side in entirety as indicated by the broken line arrow in FIG. 1, flows into the receiver tank 8 through the inlet communication pipe 62 and becomes a gas-liquid mixed refrigerant and then, the liquid refrigerant flows into the subcool core portion 10 with priority through the outlet communication pipe 64.

The refrigerant having flowed into the subcool core portion 10 performs heat exchange with the ambient air by ventilation to the subcool core portion 10, performs upflow and downflow as indicated by the broken line arrow in FIG. 1, passes from the right side to the left side and is completely liquefied by supercooling and then, is sent out to the cooling-operation channel 36b from the cooling outlet port 66. That is, the refrigerant in the cooling operation passes through both the main core portion 6 and the subcool core portion 10 in the exterior heat exchanger 1. The channel of the refrigerant from the cooling inlet port 60 of the exterior heat exchanger 1 to the cooling outlet port 66 through the main core portion 6, the receiver tank 8, and the subcool core portion 10 corresponds to the first channel in the invention of the present application.

As described above, in this embodiment, by switching each of the opening/closing valves 38, 48, 52, and 63, inflow and an outlet of the refrigerant to the exterior heat exchanger 1 are switched, and in the heating operation, the refrigerant passes only through the main core portion 6, while in the cooling operation, the refrigerant passes through the main core portion 6, the receiver tank 8, and the subcool core portion 10. Moreover, in the heating operation and the cooling operation, the passing direction of the refrigerant in the main core portion 6 becomes opposite to each other.

When the exterior heat exchanger 1 is used as an evaporator, since gas-liquid separation of the refrigerant by the receiver tank 8 and supercooling of the refrigerant in the subcool core portion 10 are not necessary, an increase of a useless pressure loss of the refrigerant caused by passage of the refrigerant through the subcool core portion 10 and hence a useless fluidity loss of the refrigerant can be prevented, and heat exchange efficiency of the exterior heat exchanger 1 can be improved.

Moreover, when the exterior heat exchanger 1 is used as an evaporator, the refrigerant passing through the main core portion 6 is made to flow by the heating-operation channel 36a by bypassing the receiver tank 8 and the subcool core portion 10, while when the exterior heat exchanger 1 is used as a condenser, the refrigerant flow to the first expansion valve 44 side can be prevented by the check valve 46 and thus, switching of the exterior heat exchanger 1 in the heat pump system 2 between an evaporator and a condenser can be performed reliably with a simple configuration.

Then, the tube 14 of the main core portion 6 and the subcool core portion 10 extends in the vertical direction and the refrigerant flows in the vertical flow direction and thus, water droplets do not easily collect on the surface of the tube 14. Therefore, occurrence of frosting and icing phenomena can be suppressed, and a drop in heat exchange efficiency of air A and the refrigerant in the main core portion 6 and the subcool core portion 10 can be suppressed. Moreover, when frosting occurs on the tube 14, if a frost melting function is provided for melting frost by allowing a high-temperature refrigerant to pass, water droplets generated on the surface of the tube 14 in this frost melting can be efficiently removed from the tube 14 by the gravity, and when a low-temperature atmosphere and a low-temperature refrigerant are made to pass after the frost melting function is finished, icing on the tube 14 can be suppressed, whereby heat exchange efficiency can be effectively maintained.

Moreover, in the subcool core portion 10, its width is suppressed and two paths are provided, whereby a channel sectional area through which the refrigerant passes is decreased. Therefore, a flow velocity of the refrigerants in the subcool core portion 10 can be raised. In the subcool core portion 10, since the refrigerant having passed through the main core portion 6 is supercooled, a large amount of a liquid-state refrigerant passes, and if the subcool core portion 10 has a vertical flow, upflow is difficult, and cooling efficiency might be lowered. However, by providing 2 paths as described above so as to raise the flow velocity, upflow is made easy and by expanding a channel length, cooling efficiency can be sufficiently ensured, and sufficient supercooling can be realized.

Moreover, in this embodiment, the main core portion 6 and the subcool core portion 10 are arranged adjacently, and the receiver tank 8 is arranged outside on the right side of the subcool core portion 10. As a result, particularly by integrally constituting the main core portion and the subcool core portion adjacently, the exterior heat exchanger 1 can be constituted in a compact manner and manufacture of the exterior heat exchanger 1 is facilitated, whereby a component cost can be reduced.

Subsequently, a heat pump system of a second embodiment of the present invention will be explained by using FIG. 3.

A heat pump system 70 of the second embodiment is further made capable of dehumidifying operation as compared with the heat pump system 2 of the second embodiment.

Figure 3:
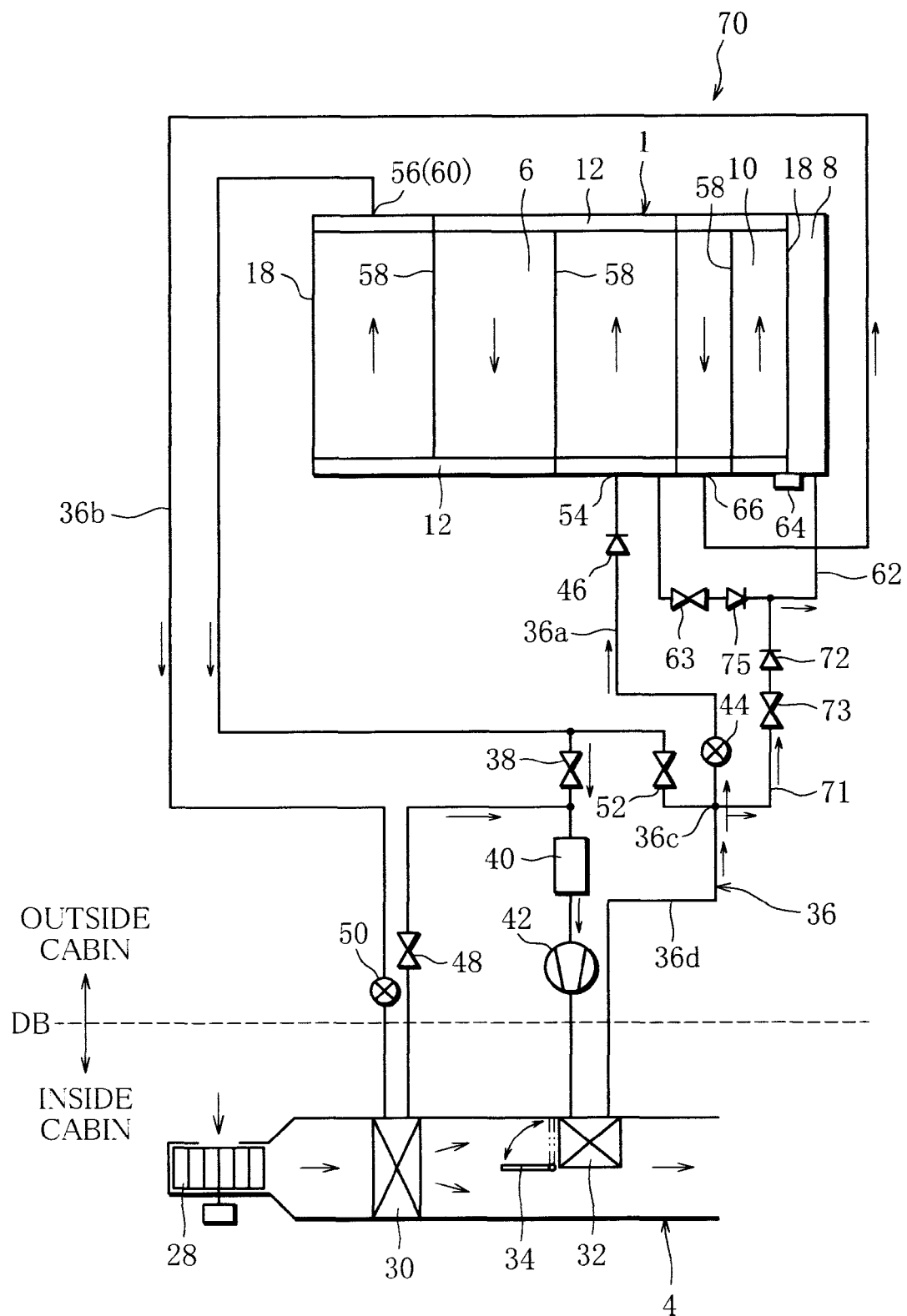
FIG. 3 is a diagram illustrating a heat pump system for air-conditioning of a vehicle according to a second embodiment of the present invention and an outline configuration of a HVAC unit.

FIG. 3 is an outline configuration diagram of the heat pump system 70 according to the second embodiment of the present invention. In FIG. 3, only a refrigerant flow direction in the dehumidifying operation is indicated by an arrow. The refrigerant flow in the heating operation and the cooling operation is similar to those in the first embodiment.

The heat pump system 70 of this embodiment is, as illustrated in FIG. 3, further provided with a bypass path in addition to the heat pump system 2 of the first embodiment.

The bypass path 71 has one end connected to the inlet communication pipe 62 between the receiver tank 8 and the fourth opening/closing valve 63 and the other end connected to the branch path 36c. In the bypass path 71, a check valve 72 for preventing passage of the refrigerant from the inlet communication pipe 62 to the branch path 36c and a fifth opening/closing valve 73 are interposed. Moreover, in the inlet communication pipe 62 between a connection portion of the bypass path 71 and the main core portion 6, a check valve 75 for preventing a flow of the refrigerant from the bypass path 71 to the main core portion 6 is provided. The fifth opening/closing valve 73 is controlled so as to close in the cooling operation and the heating operation.

In the heat pump system 70 with the above-described configuration, the first opening/closing valve 38, the second opening/closing valve 48, and the fifth opening/closing valve 73 are opened and the third opening/closing valve 52 and the fourth opening/closing valve 63 are closed in the dehumidifying operation. Moreover, by opening the damper 34, blowing air after passing through the interior evaporator 30 is allowed to pass also through the interior condenser 32.

As a result, a part of the refrigerant after passing through the interior condenser 32 flows into the first expansion valve 44 and flows into the main core portion 6 through the main heating inlet port 54. The remaining refrigerant passes through the bypass path 71 and flows into the subcool core portion 10 through the receiver tank 8.

Therefore, heating using the main core portion 6 of the exterior heat exchanger 1 and cooling using the subcool core portion 10 are both made possible, and dehumidification is made possible by cooling the air blown from the blower fan 28 by the interior evaporator 30 and then, by heating by the interior condenser 32.

In the heat pump system 70 as above, too, in a heat pump system having one exterior heat exchanger 1 similarly to the first embodiment, cooling and heating with high heat exchange rate are made possible and dehumidification is also made possible. Particularly in the dehumidification operation, a cooling channel is constituted by using the subcool core portion 10, and the dehumidification operation can be made more efficient by efficiently using the exterior heat exchanger 1. Moreover, since the subcool core portion 10 has two paths, the refrigerant can be sufficiently cooled without using the main core portion 6 in the cooling channel in the dehumidification operation, the cooling performance in the interior evaporator 30 can be improved, and the dehumidification capacity in the dehumidification operation can be ensured.

Subsequently, the heat pump system of a third embodiment of the present invention will be explained by using FIG. 5.

Figure 5:
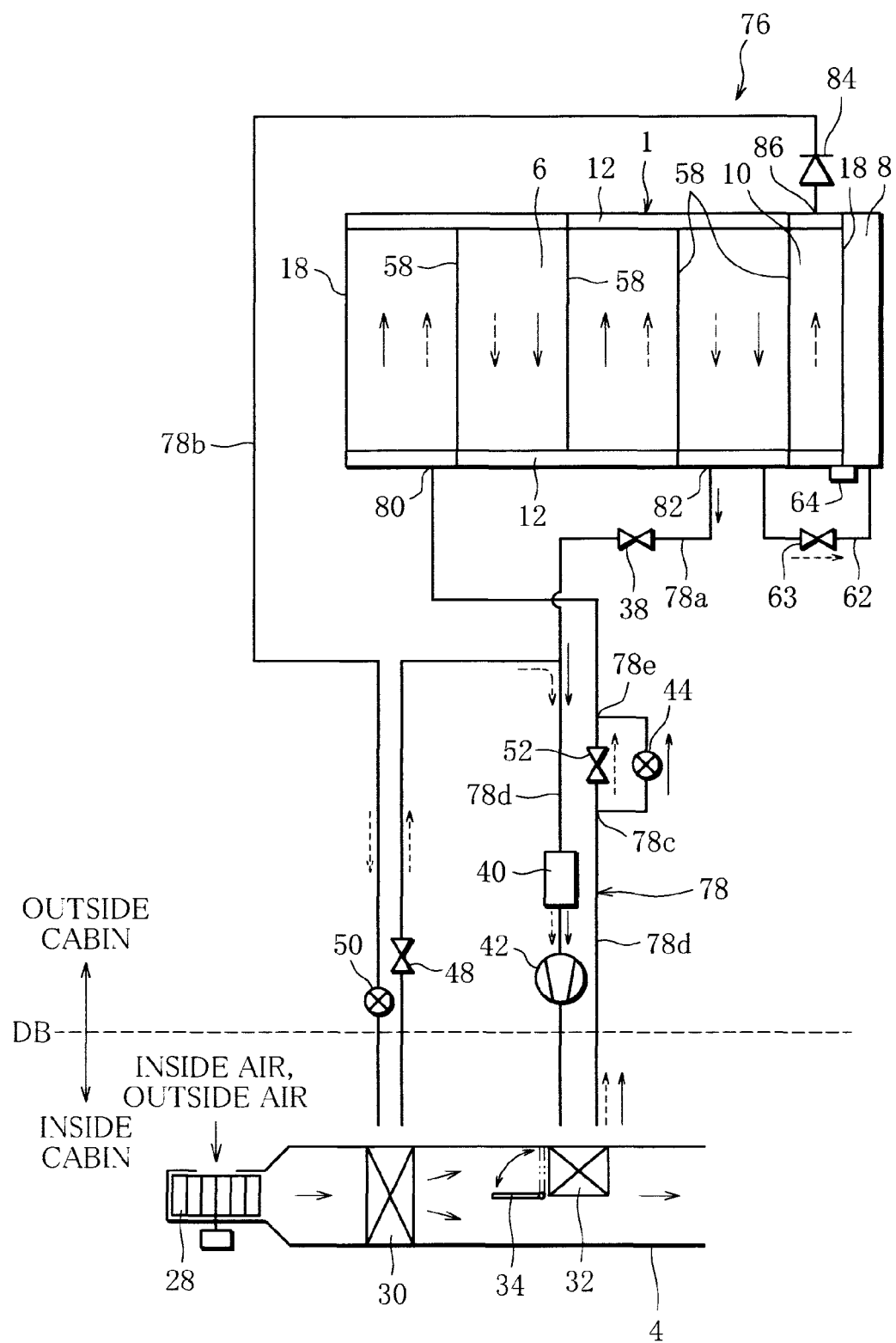
FIG. 5 is a diagram illustrating a heat pump system for air-conditioning of a vehicle according to a third embodiment of the present invention and an outline configuration of a HVAC unit.

FIG. 5 is an outline configuration diagram of a heat pump system 76 according to the third embodiment of the present invention. In FIG. 5, only the refrigerant flow direction in the heating operation and the cooling operation is indicated, explanation of the dehumidification operation is omitted, the same reference numerals are given to the configurations in common with those in the first embodiment and the explanation will be omitted.

The heat pump system 76 of this embodiment has a configuration in which the exterior heat exchanger 1 can be used by switching a condenser or an evaporator without changing the refrigerant flow direction in the main core portion 6, and the exterior heat exchanger 1 is used as an evaporator in the heating operation of the heat pump system 76 and is used as a condenser in the cooling operation.

The heat pump system 76 is provided with a refrigerant circuit 78 different from the refrigerant circuit 36, and in a heating-operation channel (second channel) 78a in the refrigerant circuit 78, the exterior heat exchanger 1, the first opening/closing valve 38, the accumulator 40, the compressor 42, the interior condenser 32, and the first expansion valve 44 are inserted in the order of the refrigerant flow direction indicated by a solid line in FIG. 5.

In this embodiment, the check valve 46 is not necessary, and a common path 78d corresponding to the common path 36a branches at a branch path 78c, and the third opening/closing valve 52 and the first expansion valve 44 are arranged in parallel and after they are merged at a merging path 78e, they are extended to a common cooling/heating inlet port 80 provided on the header tank 12 on the lower left side when seen in FIG. 5 of the main core portion 6.

Moreover, on the header tank 12 on the lower right side seen in FIG. 5 of the main core portion 6, a heating outlet port 82 is provided. In the heating operation, the refrigerant having flowed into the main core portion 6 from the cooling/heating inlet port 80 repeats downflow or upflow as described above, performs heat exchange with the ambient air by ventilation to the main core portion 6, flows from the left side to the right side in entirety, and flows out to the heating-operation channel 78a from the heating outlet port 82.

On the other hand, in the cooling-operation channel (first channel) 78b in the refrigerant circuit 78, the exterior heat exchanger 1, the check valve 84, the second expansion valve 50, the interior evaporator 30, the second opening/closing valve 48, the accumulator 40, the compressor 42, the interior condenser 32, and the third opening/closing valve 52 are inserted in the order of the refrigerant flow direction indicated by a broken line in FIG. 5. The above-described common path 78d is shared as the heating-operation channel 78a and the cooling-operation channel 78b from the accumulator 40 to the cooling/heating inlet port 80 through the compressor 42 and the interior condenser 32.

Moreover, on the header tank 12 on the upper right side seen in FIG. 5 of the main core portion 6, a cooling outlet port 86 is provided. In the cooling operation, the refrigerant having flowed into the main core portion 6 from the cooling/heating inlet port 80 repeats downflow or upflow as described above, performs heat exchange with the ambient air by ventilation to the main core portion 6, flows from the left side to the right side in entirety, flows into the receiver tank 8 through the inlet communication pipe 62 and becomes a gas-liquid mixed refrigerant and then, the liquid refrigerant flows into the subcool core portion 10 through the outlet communication pipe 64 with priority and flows out to the cooling-operation channel 78b through the cooling outlet port 86.

Here, in the heat pump system 76 of this embodiment, the refrigerant flow direction in the main core portion 6 is the same in the heating operation and the cooling operation, and in the heating operation using the exterior heat exchanger 1 as an evaporator, a configuration in which the refrigerant having flowed through the main core portion 6 is made to flow by bypassing the receiver tank 8 and the subcool core portion 10 is employed, and the refrigerant in the heating operation flows only through the main core portion 6 in the exterior heat exchanger 1.

When the exterior heat exchanger 1 is used as a condenser in the cooling operation, the fourth opening/closing valve 63 is opened and the first opening/closing valve 38 is closed so that the main core portion 6 and the receiver tank 8 are made to communicate with each other in the inlet communication pipe 62 in the cooling-operation channel 78b. On the other hand, when the exterior heat exchanger 1 is used as an evaporator in the heating operation, the fourth opening/closing valve 63 is closed and the first opening/closing valve 38 is opened so that the receiver tank 8 and the subcool core portion 10 can be bypassed in the heating-operation channel 78a.

As described above, in this embodiment, similarly to the first embodiment, in the heating operation using the exterior heat exchanger 1 as an evaporator, since gas-liquid separation of the refrigerant by the receiver tank 8 and supercooling of the refrigerant in the subcool core portion 10 are not necessary, an increase of a useless pressure loss of the refrigerant caused by passage of the refrigerant through the subcool core portion 10 and hence a useless fluidity loss of the refrigerant can be prevented, and heat exchange rate of the exterior heat exchanger 1 can be improved.

Particularly, in this embodiment, the refrigerant flow direction in the main core portion 6 is not changed in the cooling/heating and the cooling/heating inlet port 80 for common use is provided on the header tank 12 on the lower left side of the main core portion 6 and thus, as compared with the case of the first embodiment, the routing location of a refrigerant pipeline is decreased, and the total pipeline length can be reduced. Therefore, since a circuit configuration of a refrigerant circuit 78 can be simplified, switching of the exterior heat exchanger 1 between the evaporator and the condenser in the heat pump system 76 can be performed with a simpler configuration.

Explanation of the embodiments of the present invention ends here, but the present invention is not limited to the above-described embodiments but is capable of various changes within a range not departing from the gist of the present invention.

Figure 4:
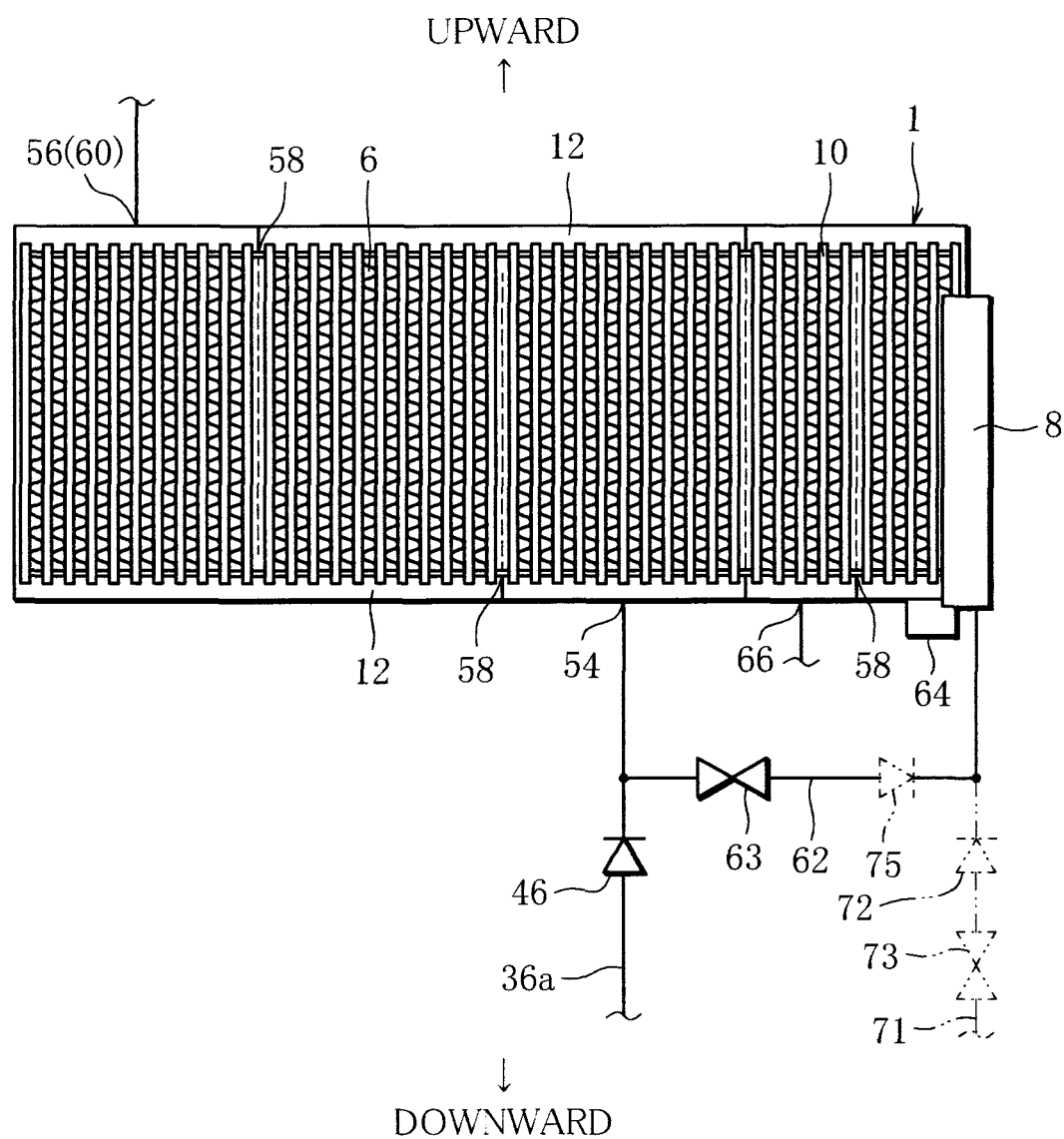
FIG. 4 is a front view illustrating a structure of an exterior heat exchanger according to another embodiment.

For example, the number of paths of the main core portion 6 and the subcool core portion 10 may be changed as appropriate. Moreover, as illustrated in FIG. 4, the end portion of the inlet communication pipe 62 on the main core portion 6 side may be connected to the heating-operation channel 36a between the heating inlet port 54 and the check valve 46 instead of connection to the header tank 12.

Moreover, in the above-described embodiments, use of the present invention in the exterior heat exchanger 1 provided outside the HVAC unit 4 for air-conditioning of a vehicle is explained, but the present invention can be also applied to heat exchangers and heat pump systems for other applications.

EXPLANATION OF REFERENCE SIGNS 1 exterior heat exchanger (heat exchanger)
2 heat pump system
6 main core portion
8 receiver tank
10 subcool core portion
12 header tank
14 tube
16 fin

The invention claimed is:

1. A heat exchanger comprising:
a main core portion for conducting heat exchange between air and a refrigerant;
  a receiver tank into which the refrigerant having passed through the main core portion flows; and
  a subcool core portion for supercooling the refrigerant having passed through the receiver tank by heat exchange with the air, wherein
  the heat exchanger is used for a heat pump system capable of cooling and heating;
  the main core portion and the subcool core portion are constituted by a pair of header tanks arranged apart from each other in a vertical direction, a plurality of tubes arranged so as to extend in the vertical direction between the header tanks and having the pair of header tanks communicate with each other, and fins provided on the tubes; and
  a first channel through which the refrigerant is made to pass in the order of the main core portion, the receiver tank, and the subcool core portion, and
  a second channel through which the refrigerant is made to pass only through the main core portion in a direction opposite to that of the first channel are provided.

2. The heat exchanger according to claim 1, wherein the subcool core portion has a plurality of paths through which the refrigerant is able to pass between the pair of header tanks at least once each in the vertical direction and has a channel sectional area of the refrigerant set smaller than that of the main core portion.

3. The heat exchanger according to claim 2, wherein the main core portion and the subcool core portion are arranged adjacently to each other.

4. The heat exchanger according to claim 1, wherein the main core portion and the subcool core portion are arranged adjacently to each other.

5. A heat exchanger comprising:
a main core portion for conducting heat exchange between air and a refrigerant;
  a receiver tank into which the refrigerant having passed through the main core portion flows; and
  a subcool core portion for supercooling the refrigerant having passed through the receiver tank by heat exchange with the air, wherein
  the heat exchanger is used for a heat pump system capable of cooling and heating;
  the main core portion and the subcool core portion are constituted by a pair of header tanks arranged apart from each other in a vertical direction, a plurality of tubes arranged so as to extend in the vertical direction between the header tanks and having the pair of header tanks communicate with each other and fins provided on the tubes; and
  a first channel through which the refrigerant is made to pass in the order of the main core portion, the receiver tank, and the subcool core portion, and
  a second channel through which the refrigerant is made to pass only through the main core portion in the same direction as that of the first channel are provided.

6. The heat exchanger according to claim 5, wherein the subcool core portion has a plurality of paths through which the refrigerant is able to pass between the pair of header tanks at least once each in the vertical direction and has a channel sectional area of the refrigerant set smaller than that of the main core portion.

7. The heat exchanger according to claim 5, wherein the main core portion and the subcool core portion are arranged adjacently to each other.

8. A heat pump system used by switching the a heat exchanger between a condenser or an evaporator,
the heat exchanger comprising:
  a main core portion for conducting heat exchange between air and a refrigerant;
  a receiver tank into which the refrigerant having passed through the main core portion flows; and
  a subcool core portion for supercooling the refrigerant having passed through the receiver tank by heat exchange with the air, wherein
  the heat exchanger is used for the heat pump system capable of cooling and heating;
  the main core portion and the subcool core portion are constituted by a pair of header tanks arranged apart from each other in a vertical direction, a plurality of tubes arranged so as to extend in the vertical direction between the header tanks and having the pair of header tanks communicate with each other, and fins provided on the tubes; and
  a first channel through which the refrigerant is made to pass in the order of the main core portion, the receiver tank, and the subcool core portion, and
  a second channel through which the refrigerant is made to pass only through the main core portion in a direction opposite to that of the first channel are provided,
  wherein
  when the heat exchanger is used as the condenser, the refrigerant is made to flow through the first channel; and
  when the heat exchanger is used as the evaporator, the refrigerant is made to flow through the second channel.

9. A heat pump system used by switching a heat exchanger between a condenser or an evaporator,
the heat exchanger comprising:
  a main core portion for conducting heat exchange between air and a refrigerant;
  a receiver tank into which the refrigerant having passed through the main core portion flows; and
a subcool core portion for supercooling the refrigerant having passed through the receiver tank by heat exchange with the air, wherein
  the heat exchanger is used for the heat pump system capable of cooling and heating;

the main core portion and the subcool core portion are constituted by a pair of header tanks arranged apart from each other in a vertical direction, a plurality of tubes arranged so as to extend in the vertical direction between the header tanks and having the pair of header tanks communicate with each other and fins provided on the tubes; and a first channel through which the refrigerant is made to pass in the order of the main core portion, the receiver tank, and the subcool core portion, and a second channel through which the refrigerant is made to pass only through the main core portion in the same direction as that of the first channel are provided, wherein when the heat exchanger is used as the condenser, the refrigerant is made to flow through the first channel; and when the heat exchanger is used as the evaporator, the refrigerant is made to flow through the second channel.

* * * * *